US009788155B1

(12) United States Patent
Kerr et al.

(10) Patent No.: US 9,788,155 B1
(45) Date of Patent: Oct. 10, 2017

(54) USER INTERFACE FOR GEOFENCE ASSOCIATED CONTENT

(71) Applicants: Michael A. Kerr, Reno, NV (US);
David Stewart, Stateline, NV (US)

(72) Inventors: Michael A. Kerr, Reno, NV (US);
David Stewart, Stateline, NV (US)

( * ) Notice: Subject to any disclaimer, the term of this patent is extended or adjusted under 35 U.S.C. 154(b) by 0 days.

(21) Appl. No.: 14/693,785

(22) Filed: Apr. 22, 2015

(51) Int. Cl.
*H04W 4/02* (2009.01)

(52) U.S. Cl.
CPC .................................. *H04W 4/021* (2013.01)

(58) Field of Classification Search
CPC ...................................................... H04W 4/021
See application file for complete search history.

(56) References Cited

U.S. PATENT DOCUMENTS

| | | |
|---|---|---|
| 4,339,798 A | 7/1982 | Hedges et al. |
| 4,856,787 A | 8/1989 | Itkis |
| 5,586,937 A | 12/1996 | Menashe |
| 5,594,491 A | 1/1997 | Hodge et al. |
| 5,630,757 A | 5/1997 | Gagin et al. |
| 5,643,086 A | 7/1997 | Alcorn et al. |
| 5,738,583 A | 4/1998 | Comas et al. |
| 5,761,416 A | 6/1998 | Mandal et al. |
| 5,761,647 A | 6/1998 | Boushy |
| 5,762,552 A | 6/1998 | Vuong et al. |
| 5,768,382 A | 6/1998 | Schneier et al. |
| 5,779,545 A | 7/1998 | Berg et al. |
| 5,800,268 A | 9/1998 | Molnick |
| 5,851,149 A | 12/1998 | Xidos et al. |
| 5,871,398 A | 2/1999 | Schneier et al. |
| 5,902,983 A | 5/1999 | Crevelt et al. |
| 5,947,821 A | 9/1999 | Stone |
| 5,971,849 A | 10/1999 | Falciglia |
| 6,001,016 A | 12/1999 | Walker et al. |
| 6,010,404 A | 1/2000 | Walker et al. |
| 6,106,396 A | 8/2000 | Alcorn et al. |
| 6,142,876 A | 11/2000 | Cumbers |

(Continued)

FOREIGN PATENT DOCUMENTS

| | | |
|---|---|---|
| JP | 2009025019 A | 2/2009 |
| WO | 2008065257 A1 | 6/2008 |

OTHER PUBLICATIONS

"Ekahau Positioning Engine 4.2." 2008. http://www.nowire.se/images/produktblad/ekahau/datasheet.sub.--epe.sub.---42.sub.--en.sub.--11022008.sub.--lo.pdf. Sep. 29, 2008.

(Continued)

*Primary Examiner* — Kashif Siddiqui
(74) *Attorney, Agent, or Firm* — Kerr IP Group, LLC

(57) ABSTRACT

A location aware user interface on a wireless handset is described. The location aware user interface comprises a location module configured to transmit a location message to a remote server via a network. The remote server is configured to determine whether the wireless handset is within a geofence. The user interface further comprises a display module configured to display at least one content item associated with the geofence. The user interface also comprises an input module configured to receive a user-created content item and transmit the received user-created content item to the remote server. The remote server is configured to associate the content item with the geofence in which the wireless handset is located.

22 Claims, 11 Drawing Sheets

(56) References Cited

U.S. PATENT DOCUMENTS

| | | | |
|---|---|---|---|
| 6,159,095 A | 12/2000 | Frohn et al. |
| 6,178,510 B1 | 1/2001 | O'Connor et al. |
| 6,203,428 B1 | 3/2001 | Giobbi et al. |
| 6,259,405 B1 | 7/2001 | Stewart et al. |
| 6,322,446 B1 | 11/2001 | Yacenda |
| 6,327,535 B1 | 12/2001 | Evans et al. |
| 6,409,602 B1 | 6/2002 | Wiltshire et al. |
| 6,500,068 B2 | 12/2002 | Walker et al. |
| 6,508,709 B1 | 1/2003 | Karmarkar |
| 6,508,710 B1 | 1/2003 | Paravia et al. |
| 6,527,638 B1 | 3/2003 | Walker et al. |
| 6,554,705 B1 | 4/2003 | Cumbers |
| 6,575,834 B1 | 6/2003 | Lindo |
| 6,606,494 B1 | 8/2003 | Arpee et al. |
| 6,612,928 B1 | 9/2003 | Bradford et al. |
| 6,628,939 B2 | 9/2003 | Paulsen |
| 6,638,170 B1 | 10/2003 | Crumby |
| 6,640,218 B1 | 10/2003 | Golding et al. |
| 6,676,522 B2 | 1/2004 | Rowe |
| 6,682,421 B1 | 1/2004 | Rowe et al. |
| 6,702,672 B1 | 3/2004 | Angell et al. |
| 6,709,333 B1 | 3/2004 | Bradford et al. |
| 6,709,631 B2 | 3/2004 | Mori et al. |
| 6,719,631 B1 | 4/2004 | Tulley et al. |
| 6,749,512 B2 | 6/2004 | MacGregor et al. |
| 6,782,253 B1 | 8/2004 | Shteyn et al. |
| 6,834,195 B2 | 12/2004 | Brandenberg et al. |
| 6,875,110 B1 | 4/2005 | Crumby |
| 6,879,838 B2 | 4/2005 | Rankin et al. |
| 6,884,162 B2 | 4/2005 | Raverdy et al. |
| 6,942,574 B1 | 9/2005 | LeMay et al. |
| 7,035,651 B2 | 4/2006 | Schreiner et al. |
| 7,076,243 B2 | 7/2006 | Parupudi et al. |
| 7,107,245 B1 | 9/2006 | Kowalick |
| 7,136,915 B2 | 11/2006 | Rieger, III |
| 7,196,662 B2 | 3/2007 | Misikangas et al. |
| 7,209,752 B2 | 4/2007 | Myllymaki et al. |
| 7,213,048 B1 | 5/2007 | Parupudi et al. |
| 7,218,941 B1 | 5/2007 | Kubo et al. |
| 7,228,136 B2 | 6/2007 | Myllymaki et al. |
| 7,299,059 B2 | 11/2007 | Misikangas et al. |
| 7,338,372 B2 | 3/2008 | Morrow et al. |
| 7,341,522 B2 | 3/2008 | Yamagishi |
| 7,349,683 B2 | 3/2008 | Misikangas |
| 7,359,714 B2 | 4/2008 | Parupudi et al. |
| 7,397,424 B2 | 7/2008 | Houri |
| 7,450,954 B2 | 11/2008 | Randall |
| 7,493,565 B2 | 2/2009 | Parupudi et al. |
| 7,529,639 B2 | 5/2009 | Kikta et al. |
| 7,534,169 B2 | 5/2009 | Amaitis et al. |
| 7,611,407 B1 | 11/2009 | Itkis et al. |
| 7,753,772 B1 | 7/2010 | Walker et al. |
| 8,002,617 B1 | 8/2011 | Uskela et al. |
| 8,029,349 B2 | 10/2011 | Lind |
| 8,172,684 B2 | 5/2012 | Adiraju et al. |
| 8,403,755 B2 | 3/2013 | Kerr |
| 8,492,995 B2 | 7/2013 | Maxik et al. |
| 8,506,406 B2 | 8/2013 | Kerr |
| 8,506,407 B2 | 8/2013 | Kerr |
| 8,523,679 B2 | 9/2013 | Kerr |
| 8,738,024 B1 | 5/2014 | Kerr |
| 8,747,229 B2 | 6/2014 | Kerr |
| 8,942,995 B1 | 1/2015 | Kerr |
| 9,043,222 B1 | 5/2015 | Kerr et al. |
| 9,262,596 B1* | 2/2016 | Steiner .................. G06F 21/10 |
| 2001/0004768 A1 | 6/2001 | Hodge et al. |
| 2001/0005908 A1 | 6/2001 | Hodge et al. |
| 2001/0036224 A1 | 11/2001 | Demello et al. |
| 2001/0039210 A1 | 11/2001 | St-Denis |
| 2001/0044337 A1 | 11/2001 | Rowe et al. |
| 2002/0002073 A1 | 1/2002 | Montgomery et al. |
| 2002/0007494 A1 | 1/2002 | Hodge |
| 2002/0056125 A1 | 5/2002 | Hodge et al. |
| 2002/0056143 A1 | 5/2002 | Hodge et al. |
| 2002/0069105 A1 | 6/2002 | do Rosario Botelho et al. |
| 2002/0077130 A1 | 6/2002 | Owensby |
| 2002/0077167 A1 | 6/2002 | Merari |
| 2002/0091568 A1 | 7/2002 | Kraft et al. |
| 2002/0103028 A1 | 8/2002 | Carter et al. |
| 2002/0111210 A1 | 8/2002 | Luciano et al. |
| 2002/0111907 A1 | 8/2002 | Ling |
| 2002/0133707 A1 | 9/2002 | Newcombe |
| 2002/0142815 A1 | 10/2002 | Candelore |
| 2002/0142844 A1 | 10/2002 | Kerr |
| 2002/0142846 A1 | 10/2002 | Paulsen |
| 2002/0144151 A1 | 10/2002 | Shell et al. |
| 2002/0174436 A1 | 11/2002 | Wu et al. |
| 2002/0198775 A1 | 12/2002 | Ryan |
| 2003/0009385 A1 | 1/2003 | Tucciarone et al. |
| 2003/0030666 A1 | 2/2003 | Najmi et al. |
| 2003/0032409 A1 | 2/2003 | Hutcheson et al. |
| 2003/0064805 A1 | 4/2003 | Wells |
| 2003/0119578 A1 | 6/2003 | Newson |
| 2003/0144017 A1 | 7/2003 | Inselberg |
| 2004/0023721 A1 | 2/2004 | Giobbi |
| 2004/0192438 A1 | 9/2004 | Wells et al. |
| 2004/0224757 A1 | 11/2004 | Yamamura et al. |
| 2005/0046608 A1 | 3/2005 | Schantz et al. |
| 2005/0048990 A1 | 3/2005 | Lauriol |
| 2005/0085257 A1 | 4/2005 | Laird |
| 2005/0114212 A1 | 5/2005 | Carrez et al. |
| 2005/0136949 A1 | 6/2005 | Barnes, Jr. |
| 2005/0154646 A1 | 7/2005 | Chermesino |
| 2005/0159883 A1 | 7/2005 | Humphries et al. |
| 2005/0181804 A1 | 8/2005 | Misikangas et al. |
| 2005/0246334 A1 | 11/2005 | Tao et al. |
| 2005/0261063 A1 | 11/2005 | Boyd et al. |
| 2006/0003830 A1 | 1/2006 | Walker et al. |
| 2006/0004627 A1 | 1/2006 | Baluja |
| 2006/0058102 A1 | 3/2006 | Nguyen et al. |
| 2006/0063575 A1 | 3/2006 | Gatto et al. |
| 2006/0125693 A1 | 6/2006 | Recker |
| 2006/0181411 A1 | 8/2006 | Fast et al. |
| 2006/0189382 A1 | 8/2006 | Muir et al. |
| 2006/0194633 A1 | 8/2006 | Paulsen |
| 2006/0238382 A1 | 10/2006 | Kimchi et al. |
| 2006/0240891 A1 | 10/2006 | Klinkhammer et al. |
| 2006/0287810 A1 | 12/2006 | Sadri et al. |
| 2007/0008108 A1 | 1/2007 | Schurig et al. |
| 2007/0024580 A1 | 2/2007 | Sands et al. |
| 2007/0025265 A1 | 2/2007 | Porras et al. |
| 2007/0060306 A1 | 3/2007 | Amaitis et al. |
| 2007/0061229 A1 | 3/2007 | Ramer et al. |
| 2007/0087834 A1 | 4/2007 | Moser et al. |
| 2007/0100963 A1 | 5/2007 | Ban et al. |
| 2007/0136132 A1 | 6/2007 | Weiser et al. |
| 2007/0149215 A1 | 6/2007 | Misikangas |
| 2007/0149216 A1 | 6/2007 | Misikangas |
| 2007/0167210 A1 | 7/2007 | Kelly et al. |
| 2007/0168127 A1 | 7/2007 | Zaruba et al. |
| 2007/0184852 A1 | 8/2007 | Johnson et al. |
| 2007/0218975 A1 | 9/2007 | Iddings et al. |
| 2007/0243925 A1 | 10/2007 | LeMay et al. |
| 2007/0244633 A1 | 10/2007 | Phillips et al. |
| 2007/0257831 A1 | 11/2007 | Mathews et al. |
| 2007/0270212 A1 | 11/2007 | Cockerille et al. |
| 2007/0281692 A1 | 12/2007 | Bucher et al. |
| 2008/0026844 A1 | 1/2008 | Wells |
| 2008/0032705 A1 | 2/2008 | Patel et al. |
| 2008/0039192 A1 | 2/2008 | Laut |
| 2008/0057894 A1 | 3/2008 | Aleksic et al. |
| 2008/0076572 A1 | 3/2008 | Nguyen et al. |
| 2008/0085692 A1 | 4/2008 | Hart et al. |
| 2008/0096659 A1 | 4/2008 | Kreloff et al. |
| 2008/0097858 A1 | 4/2008 | Vucina et al. |
| 2008/0102947 A1 | 5/2008 | Hays et al. |
| 2008/0108430 A1 | 5/2008 | Evans et al. |
| 2008/0113785 A1 | 5/2008 | Alderucci et al. |
| 2008/0153515 A1 | 6/2008 | Mock et al. |
| 2008/0162037 A1 | 7/2008 | Mahmoud |
| 2008/0166973 A1 | 7/2008 | Hart et al. |
| 2008/0167106 A1 | 7/2008 | Lutnick et al. |
| 2008/0186234 A1 | 8/2008 | Alles et al. |
| 2008/0189360 A1 | 8/2008 | Kiley et al. |

(56) References Cited

U.S. PATENT DOCUMENTS

| | | | |
|---|---|---|---|
| 2008/0207296 A1 | 8/2008 | Lutnick et al. | |
| 2008/0227473 A1 | 9/2008 | Haney | |
| 2008/0249833 A1 | 10/2008 | Ali et al. | |
| 2008/0252527 A1 | 10/2008 | Garcia | |
| 2008/0281668 A1 | 11/2008 | Nurminen | |
| 2009/0018929 A1 | 1/2009 | Weathers | |
| 2009/0150217 A1 | 6/2009 | Luff | |
| 2009/0197684 A1 | 8/2009 | Arezina et al. | |
| 2009/0213771 A1 | 8/2009 | Celentano et al. | |
| 2009/0214036 A1 | 8/2009 | Shen et al. | |
| 2009/0298513 A1 | 12/2009 | Hampel et al. | |
| 2010/0022308 A1 | 1/2010 | Hartmann et al. | |
| 2010/0027521 A1 | 2/2010 | Huber et al. | |
| 2010/0039929 A1 | 2/2010 | Cho et al. | |
| 2010/0048242 A1 | 2/2010 | Rhoads et al. | |
| 2010/0063854 A1 | 3/2010 | Purvis et al. | |
| 2010/0121567 A1 | 5/2010 | Mendelson | |
| 2010/0167771 A1 | 7/2010 | Raghothaman et al. | |
| 2010/0179885 A1 | 7/2010 | Fiorentino | |
| 2010/0280960 A1 | 11/2010 | Ziotopoulos et al. | |
| 2010/0287033 A1 | 11/2010 | Mathur | |
| 2010/0302056 A1 | 12/2010 | Dutton et al. | |
| 2010/0305855 A1 | 12/2010 | Dutton et al. | |
| 2010/0331016 A1 | 12/2010 | Dutton et al. | |
| 2011/0078167 A1 | 3/2011 | Sundaresan et al. | |
| 2011/0103360 A1 | 5/2011 | Ku et al. | |
| 2012/0008526 A1* | 1/2012 | Borghei | H04W 4/08 370/254 |
| 2012/0115512 A1 | 5/2012 | Grainger et al. | |
| 2012/0122476 A1 | 5/2012 | Lee et al. | |
| 2013/0003572 A1 | 1/2013 | Kim et al. | |

OTHER PUBLICATIONS

"Internet industry Interacting Gambling Code: A Code for Industry Co-Regulation in the Area of Internet Gambling Content Pursuant to the Requirements of the Interactive Gambling Act 2001." Internet industry Association. Dec. 2001.
"Location in SIP/IP Core Architecture." Open Mobile Alliance. Sep. 4, 2008. Accessed Dec. 2008. http://www.openmobilealliance.org/technical/release.sub.--program/locsip.-sub.--archive.aspx.
"The New Normal of Retailing: The Rise of the Mobile Shopper." Next Generation Retail Summit. 2010. http://www.ngrsummit.com/media/whitepapers/Microsoft.sub.--NGRUS.pdf.
"Tracking Cookie." Wikipedia. http://en.wikipedia.org/wiki/Tracking.sub.--cookie. May 24, 2009.
"Wi-Fi Location-Based Services—Design and Deployment Considerations." 2006 Cisco Systems. Accessed Dec. 2008. https://learningnetwork.cisco.com/docs/DOC-3418.
"Wireless Network." Wikipedia. http://en.wikipedia.org/wiki/Wireless.sub.--network. Nov. 17, 2008.
Balakrishnan et al. "Lessons from Developing and Deploying the Cricket Indoor Location System." Nov. 7, 2003. http://www.sds.lcs.mit.edu/projects/cricket/V1Exp.pdf.
Blom et al. "Transmission Power Measurements for Wireless Sensor Nodes and their Relationship to Battery Level." Symposium on Wireless Communication Systems. pp. 342-345, Sep. 7, 2005.
Borriello et al. "Delivering Real-World Ubiquitous Location Systems." Communications of the ACM. pp. 36-41, vol. 48, Issue 3, Mar. 2005.
Capkun et al. "Mobility Helps Peer-to-Peer Security." IEEE Transactions on Mobile Computing. vol. 5, Issue 1, pp. 43-51, Jan. 2006.
Chawathe et al. "A Case Study in Building Layered DHT Applications." Proceedings of the 2005 conference on Applications, technologies, architectures, and protocols for computer communications. vol. 35, Issue 4, Oct. 2005.
Chen et al. "Practical Metropolitan-Scale Positioning for GSM Phone." UbiComp 2006: Ubiquitous Computing Lecture Notes in Computer Science, 2006, vol. 4206/2006, pp. 225-242.
Cheng et al. "Accuracy Characterization for Metropolitan-scale Wi-Fi Localization." Proceedings of the 3rd international conference on Mobile systems, applications, and services. 2005.
Heidari, Mohannad. "A Testbed for Real-Time Performance Evaluation of RSS-Based Indoor Geolocation Systems in a Laboratory Environment". Apr. 21, 2005. Accessed Dec. 2008. https://www.wpi.edu/Pubs/ETD/Available/etd-050407-112549/unrestricted/mas- sad.pdf.
Hightower et al. "Practical Lessons from the Place Lab." IEEE Pervasive Computing. pp. 32-39, vol. 5, Issue 3, Jul.-Sep. 2006.
Hile et al. "Indoor Location Estimation with Placelab." http://www.cs.washington.edu/education/courses/cse590gb/04wi/projects/hil- e-liu/. Jan. 8, 2004. Accessed on Sep. 25, 2008.
HTTP Cookie, redirected from tracking cookie as downloaded from wikipedia, 41 pages.
Kang "Extracting Places from Traces of Locations." ACM SIGMOBILE Mobile Computing and Communications Review. vol. 9, Issue 3, Jul. 2005.
Kitasuka et al. "Positioning Technique of Wireless LAN Terminal Using RSSI between Terminals". Jun. 2005. Accessed Dec. 2008. http://www.techrepublic.com/whitepapers/positioning-technique-of-wireless- -lan-terminals-using-rssi-between-terminals/330959.
Ladd et al. "On the Feasibility of Using Wireless Ethernet for Indoor Localization." IEEE Transactions on Robotics and Automation, pp. 555-559, vol. 20, Issue 3, No. 3, Jun. 2004.
Ladd et al. "Using Wireless Ethernet for Localization." IEEE/RJS International Conference on Intelligent Robots and Systems. 2002.
Lafargue, Edouard. "Wireless Network Audits using Open Source Tools". SANS Institute 2003. Accessed Dec. 2008. http://www.sans.org/reading.sub.--room/whitepapers/auditing/wireless-netw- ork-audits-open-source-tools.sub.--1235.
Lamarca et al. "Finding Yourself: Experimental location technology relies on Wi-Fi and cellphone signals instead of orbiting satellites." Dec. 2004. http://spectrum.ieee.org/computing/networks/finding-yourself.
Lamarca et al. "Place Lab: Positioning Using Radio Beacons in the Wild." Pervasive 2005, LNCS 3468, pp. 116-133, 2005.
Lamarca et al. "Self-Mapping in 802.11 Location Systems." UbiComp 2005: Ubiquitous Computing Lecture Notes in Computer Science, 2005, vol. 3660/2005, 903, DOI: 10.1007/11551201.sub.—6.
Letchner et al. "Large-Scale Localization from Wireless Signal Strength." In Proceedings of the National Conference on Artificial Intelligence (AAAI), 2005.
Li et al. "A New Method for Yielding a Database of Location Fingerprints in WLAN" IEE Communications Proceedings, pp. 580-586, vol. 152, Issue 5, Oct. 7, 2005.
Milojicic et al. "Peer-to-Peer Computing" Jul. 10, 2002. https://www.hpl.hp.com/techreports/2002/HPL-2002-57R1.pdf.
Muthukrishnan, et al. "Sensing motion using spectral and spatial analysis of WLAN RSSI." Proceedings of the 2nd European conference on Smart sensing and context. 2007. pp. 62-76.
Otsason et al. "Accurate GSM Indoor Localization." Ubiquitous Computing 2005, LNCS 3660, pp. 141-158, 2005.
Sakata et al. "An efficient algorithm for Kriging approximation and optimization with large-scale sampling data". Computer Methods in Applied Mechanics and Engineering. vol. 193, Issues 3-5, pp. 385-404, Jan. 23, 2004.
Schilit et al. "Challenge: Ubiquitous Location-Aware Computing and the "Place Lab" Initiative." WMASH Proceedings of the 1st ACM International Workshop on Wireless Mobile Applications and Services on WLAN Hotspots. 2003.
Varshavsky et al. "Are GSM Phones the Solution for Localization?" 7th IEEE Workshop on Mobile Computing Systems and Applications, 2006. pp. 34-42, Aug. 1, 2005.
Vegni et al. "Local Positioning Services on IEEE 802.11 Networks." Radio Engineering, pp. 42-47, vol. 17, No. 2, Jun. 2008.
Want et al. "The Active Badge Location System." ACM Transactions on Office Information Systems (TOIS) vol. 10. No. 1, pp. 91-102, Jan. 1992.
Welbourne et al. "Mobile Context Inference Using Low-Cost Sensors." Location and Context-Awareness Lecture Notes in Computer Science, 2005, vol. 3479/2005, pp. 95-127.

(56) References Cited

OTHER PUBLICATIONS

Wireless Network as downloaded from wikipedia.com, pages. 5 pages.
Wirelss Network. Wikipedia. http://en.wikipedia.org/wiki/Wireless.sub.--network. Nov. 17, 2008.
Youssef et al. "Location-Clustering Techniques for WLAN Location Determination Systems." 2006. http://wrc.ejust.edu.eg/papers/ijca.pdf.

\* cited by examiner

USER INTERFACE FOR GEOFENCE ASSOCIATED CONTENT

CROSS-REFERENCE

This patent application claims the benefit of provisional patent application 61/454,664 entitled USER INTERFACE FOR GEOFENCE-ASSOCIATED CONTENT filed on Mar. 21, 2011;

This patent application claims the benefit of provisional patent application 61/427,753 entitled INTERACTIVE DISPLAY SYSTEM filed on Dec. 28, 2010;

This patent application claims the benefit of provisional patent application 61/427,755 entitled INTERACTIVE DISPLAY SYSTEM filed on Dec. 28, 2010;

This patent application claims the benefit of provisional patent application 61/472,054 entitled CONTENT RELEVANCE WEIGHTING SYSTEM filed on Apr. 5, 2011, This patent application claims the benefit of provisional patent application 61/482,834 entitled CONTENT RELEVANCE WEIGHTING SYSTEM filed on May 5, 2011, This patent application is a continuation-in-part of patent application Ser. No. 13/218,256 entitled SYSTEM AND METHOD FOR HANDSET POSITIONING WITH DYNAMICALLY UPDATED WI-FI FINGERPRINTING filed on Aug. 25, 2011 that claims the benefit of provisional patent application 61/376,936 filed on Aug. 25, 2010, provisional patent application 61/351,770 filed on Jun. 4, 2010, and provisional patent application 61/352,242 filed on Jun. 7, 2010;

This patent application is a continuation-in-part of patent application Ser. No. 13/153,214 entitled MERCHANT CONTROLLED PLATFORM SYSTEM AND METHOD filed on Jun. 3, 2011 that claims the benefit of provisional patent application 61/351,677 filed on Jun. 4, 2010, provisional patent application 61/351,770 filed on Jun. 4, 2010, and provisional patent application 61/352,242 filed on Jun. 7, 2010;

This patent application is a continuation-in-part of patent application Ser. No. 13/153,238 entitled MERCHANT CONTROL PLATFORM SYSTEM AND METHOD WITH LOCATION-BASED CONTENT DELIVERY filed on Jun. 3, 2011 that claims the benefit of provisional patent application 61/351,677 filed on Jun. 4, 2010, provisional patent application 61/351,770 filed on Jun. 4, 2010, and provisional patent application 61/352,242 filed on Jun. 7, 2010;

This patent application is a continuation-in-part of patent application of patent application Ser. No. 13/153,248 entitled LOCATION POSITIONING ENGINE SYSTEM AND METHOD filed on Jun. 3, 2011 that claims the benefit of the benefit of provisional patent application 61/351,677 filed on Jun. 4, 2010, provisional patent application 61/351,770 filed on Jun. 4, 2010, and provisional patent application 61/352,242 filed on Jun. 7, 2010;

This patent application is a continuation-in-part of patent application Ser. No. 12/821,852 entitled MOBILE AUTONOMOUS DYNAMIC GRAPHICAL USER INTERFACE APPLICATION FRAMEWORK filed on Jun. 23, 2010 that claims the benefit of provisional patent application 61/223,565 filed on Jul. 7, 2009;

This patent application is a continuation-in-part of patent application Ser. No. 12/413,547 entitled MOBILE AUTONOMOUS DYNAMIC GRAPHICAL USER INTERFACE filed on Mar. 28, 2009 that claims the benefit of provisional patent application 61/040,661 filed on Mar. 29, 2008; and The above patent applications are hereby incorporated by reference in this patent application.

FIELD

The present invention relates to a user interface for displaying and receiving location-based content. More particularly, the present invention relates to a system and method for determining the position of a wireless handset relative to a geofence, displaying content associated with the geofence and associating received content input with the geofence.

BACKGROUND

User interfaces that display content based on the determined location of a wireless handset are well known. For example, mobile applications available for the services of Yelp and Foursquare determine the location of a wireless handset and have a user interface that presents a list of establishments to the wireless handset user based on the determined location. After selecting an establishment from the list, the user may then view content associated with the establishment, including content provided by the establishment and provided by other users. The user may input content into the user interface. The input content is stored in association with the establishment and may be available to other users who select the establishment.

Existing location-aware user interfaces are limited in that content is typically associated with a particular establishment. Such interfaces lack a means for associating content with multiple locations within an establishment. A user wishing to view or create content associated with a location that is not associated with an establishment is not able to do so without creating an establishment or ersatz establishment to represent the location. Thus, there is a need for a user interface to display and receive content associated with a virtual geographical boundary or "geofence".

SUMMARY

A location aware user interface on a wireless handset is described. The location aware user interface (hereinafter "user interface") comprises a location module configured to transmit a location message to a remote server via a network. The remote server is configured to determine whether the wireless handset is within a geofence. The user interface further comprises a display module configured to display at least one content item associated with the geofence. The user interface also comprises an input module configured to receive a user-created content item and transmit the received user-created content item to the remote server. The remote server is configured to associate the content item with the geofence in which the wireless handset is located.

In another embodiment, a location aware content delivery system is described. The location aware content delivery system comprises a wireless handset configured to transmit a location message to a remote server via a network. The remote server comprises a positioning module configured to receive the location message from the wireless handset. The positioning module is further configured to determine if the wireless handset is within a geofence. The remote server also comprises a content module configured to transmit at least one content item associated with the geofence to the wireless handset. A user interface executed by the wireless handset is configured to display the at least one content item. The user interface also receives a user-created content item and transmits the user-created content item to the remote server. The remote server is configured to store the user-created content item in association with the geofence in which the wireless handset is located.

A method for location aware content delivery is also described. The method comprises transmitting a location signal from a wireless handset to a remote server via a network. The method further comprises determining with the remote server if the wireless handset is within a geofence. The remote server filters content items to select content items associated with a geofence in which the wireless handset is located. The remote server transmits to the wireless handset at least one content item associated with the geofence. A user interface executed by the wireless handset displays the at least one content item. The wireless handset receives a user-created content item and transmits the user-created content item to the remote server. The remote server stores the user-created content item in association with the geofence in which the wireless handset is located.

FIGURES

The present invention will be more fully understood by reference to the following drawings which are for illustrative, not limiting, purposes.

DETAILED DESCRIPTION

Persons of ordinary skill in the art will realize that the following description is illustrative and not in any way limiting. Other embodiments of the claimed subject matter will readily suggest themselves to such skilled persons having the benefit of this disclosure.

A location aware content delivery system and user interface is described. The user interface displays content associated with a geofence within which the wireless handset is located. The user interface also allows a user to input content. The input content is associated with the geofence in which the wireless handset is located.

Figure 1:
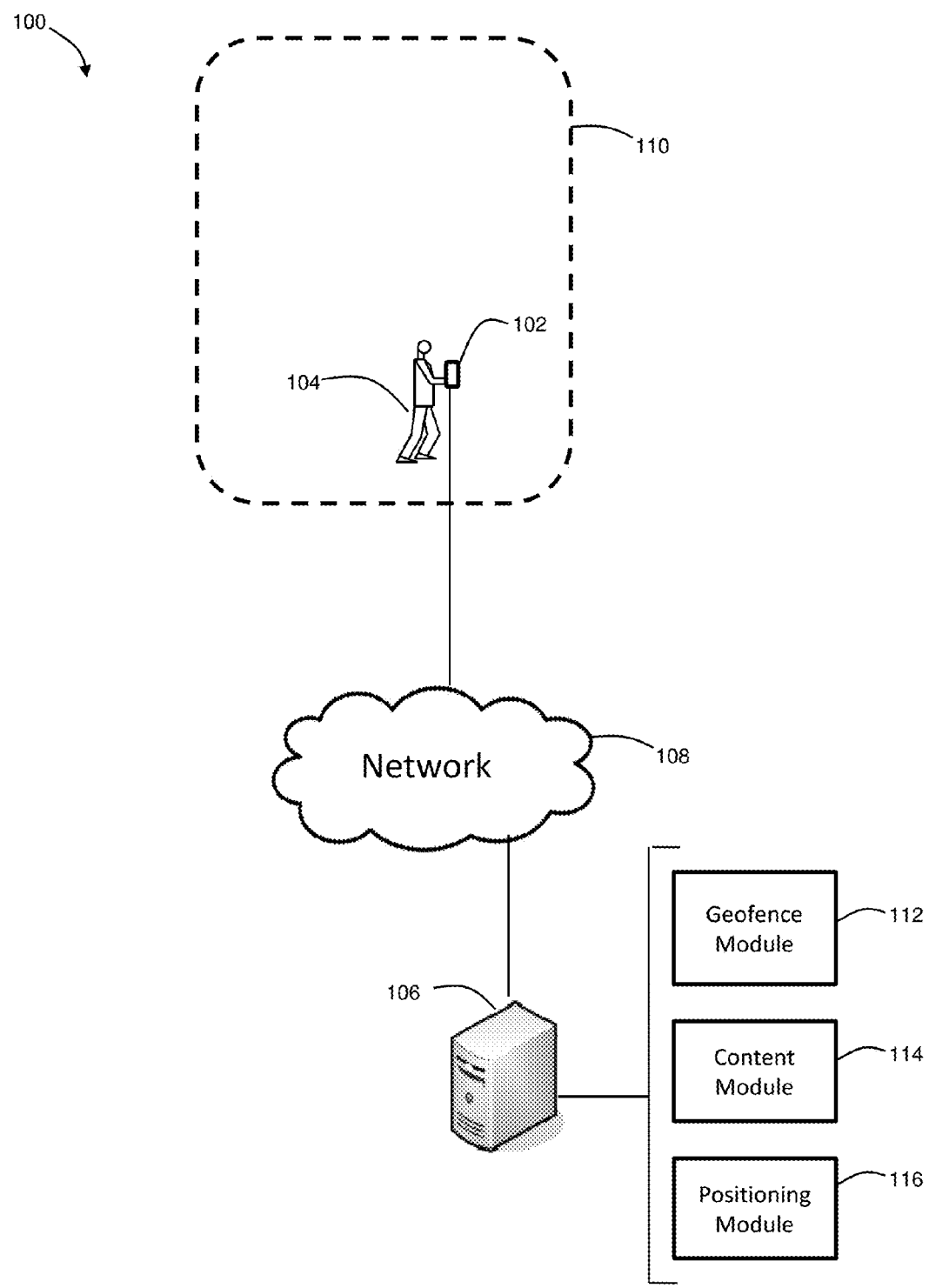
FIG. 1 shows an illustrative system diagram of an illustrative location aware content delivery system.

Referring to FIG. 1, a system diagram of an illustrative location aware content delivery system is shown. Wireless handset 102 is operated by user 104. The wireless handset may be a mobile handset, mobile phone, wireless phone, portable cell phone, cellular phone, portable phone, a personal digital assistant (PDA), a tablet, a portable media device, or any type of mobile terminal which is regularly carried by a user and has all the elements necessary for operation in a wireless communication system. A location module of the wireless handset periodically transmits a location message from wireless handset 102 to remote server 106 via network 108. The wireless communications include, by way of example and not of limitation, CDMA, WCDMA, GSM or UMTS or any other wireless communication system such as wireless local area network (WLAN), Wi-Fi or WiMAX. Network 108 may be a local area network ("LAN"), wide area network ("WAN"), or any other network to facilitate communication among computers and wireless communication devices.

Remote server 106 comprises positioning module 116, geofence module 112 and content module 114. Geofence module 112 receives and stores the location of geofences or other location indicators. Content module 114 receives and stores content items and data associated with the content items, such as a geofence or other location indicator. Positioning module 116 receives a location message from the wireless handset and determines the location of the wireless handset. When the remote server determines the wireless handset 102 is located within geofence 110, the remote server transmits at least one content item associated with the geofence to the wireless handset via network 108. Although the modules 112-116 are shown located on remote server 106, the modules may be located on separate remote servers. The data stored by the modules may be stored in a database located on remote server 106 or on a plurality of servers separate from, or in addition to, remote server 106. Typically, the remote server filters a database comprising content item data to select content items associated with the geofence. The content items may be further filtered by relevance weight value or other filters. In some embodiments, only those content items having a relevance weight value exceeding a predetermined threshold value are sent to the wireless handset.

The location message comprises information about the location of the wireless handset. In some embodiments, the location message comprises a signal strength, e.g. a received signal strength indicator (RSSI), and identification, e.g., a Media Access Control address (MAC address), of a signal received by the wireless handset from one or more wireless transmitters. The wireless transmitter is a radio frequency transmitter, such as a wireless access point or femtocell. The location of the wireless handset may be determined by assessing the signal strength of one or more wireless transmitter signals received by the handset in comparison to known locations of the wireless transmitters. Exemplary methods for determining the location of a wireless handset based on known locations of wireless transmitters are described in applications 61/352,242 filed Jun. 7, 2010 and 61/376,936 filed Aug. 25, 2010, incorporated herein by reference. In other embodiments, the location message comprises location information such as Global Positioning System (GPS) or other positioning system coordinates. In a further alternative embodiment, the user indicates the location of the wireless handset, for example, by using the wireless handset to capture an image of the environment. The image is compared to a database of images to determine the location of the handset. The user may alternatively select a location indicator from a menu displayed on the wireless handset. It will be recognized that other methods may be used to communicate information regarding the location of the wireless handset to the remote server.

The remote server interprets the location message to determine whether the wireless handset is located within geofence 110. A geofence is a virtual geographic boundary line delineating a geographic area. The area within the geofence may be referred to as a content bubble. An illustrative interface for creating a geofence is described in FIGS. 8-9. When the wireless handset 102 is within geofence 110, the remote server 106 transmits at least one content item associated with the geofence 110 to the wireless handset 102 via the network 108. A display module of the wireless handset displays the at least one content item.

Figure 9:
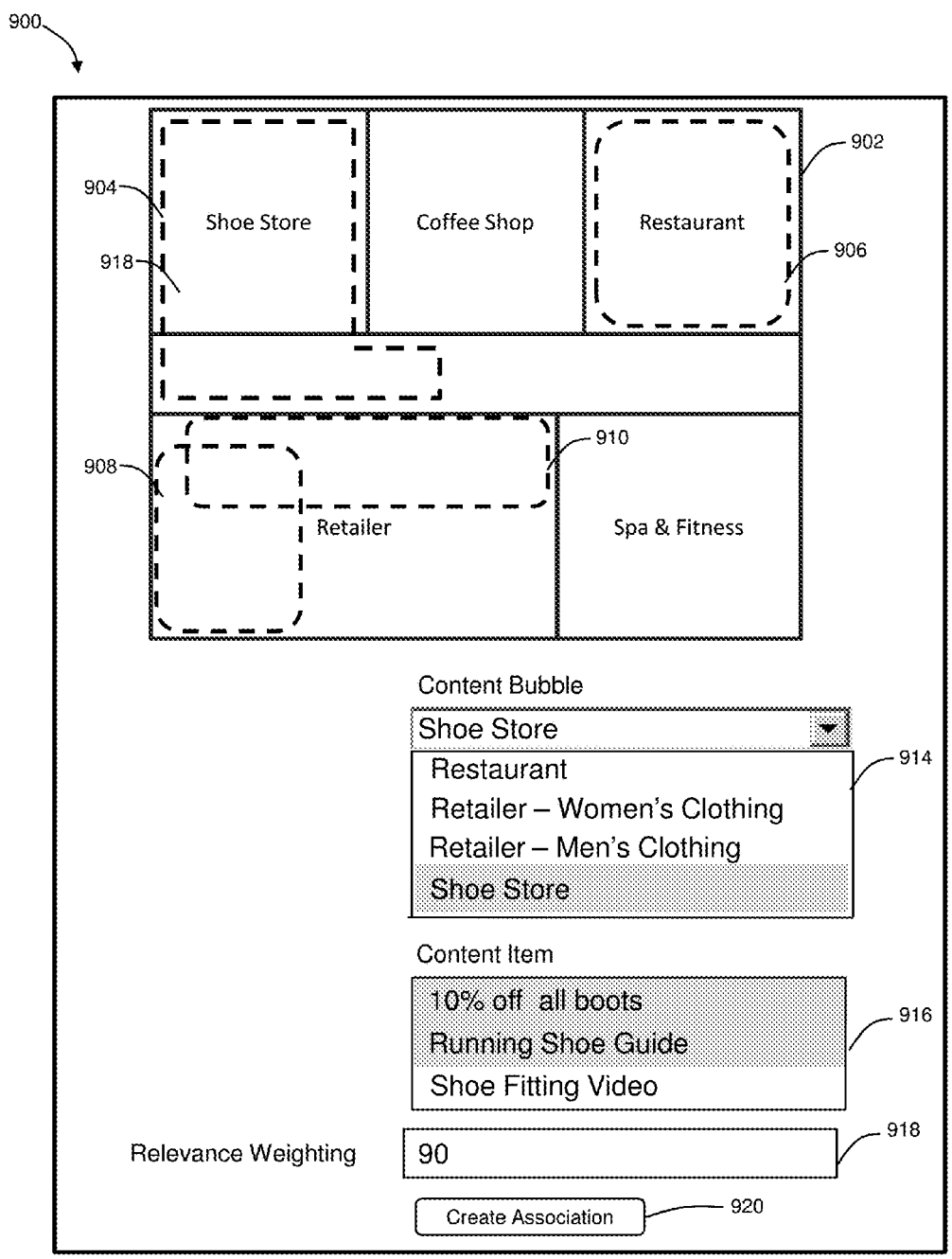
FIG. 9 shows an illustrative geofence creation interface.

An illustrative interface for associating content with a geofence is described in FIG. 9. The remote server may receive location messages from the wireless handset at predefined intervals, such as one second intervals to one minute intervals, e.g. five second intervals. The remote server may transmit new content item data each time the location message is received. In this manner, the content item data displayed on the wireless handset is updated as the location of the user changes, such that some or all of the content item data displayed to the user is relevant to the user's location. In some embodiments, content item data is not updated until the content item has been displayed on the handset for a predetermined period of time.

In an alternative embodiment, the remote server may interpret the location message to determine whether the wireless handset is located within a predefined distance of an access point. The distance between the access point and the wireless handset may be determined on the basis of a threshold signal strength. When the signal strength exceeds a predefined threshold, the remote server transmits at least one content item associated with the location indicated by the signal identifier of the access point.

In a further embodiment, the remote server may interpret the location message to determine whether the wireless handset is located within a predefined distance of a geographical point, e.g., a GPS coordinate set. The remote server may transmit at least one content item associated with the geographical point to the wireless handset when the wireless handset is within the predefined distance, such as three feet to 100 feet, e.g., 10 feet, of the geographical point. When the determined location of the handset is within the predefined distance of the geographical point, the remote server transmits at least one content item associated with the geographical point.

A content item may also be associated with an entire premises comprising one or more geofences or geographical points.

Figure 2:
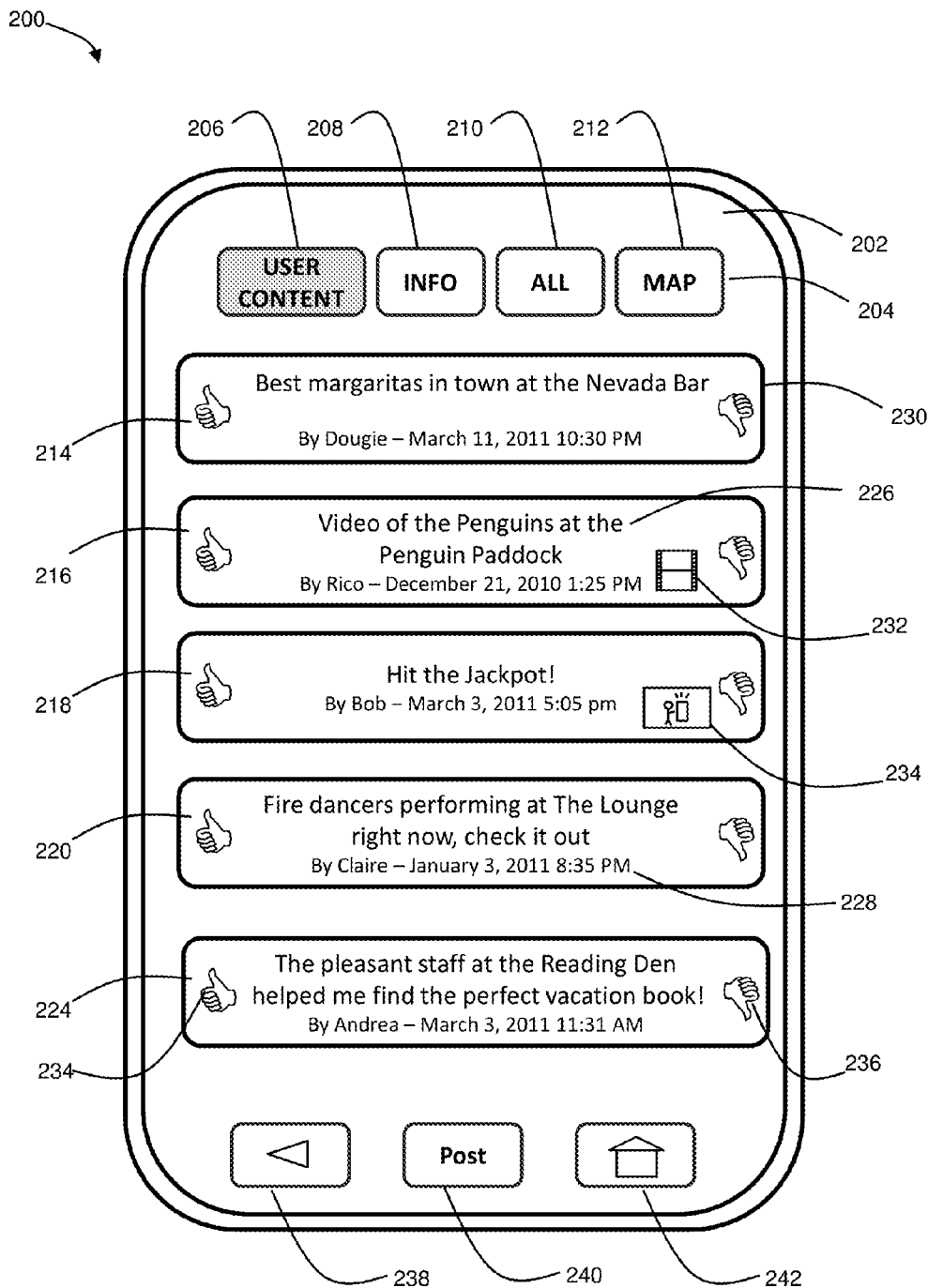
FIG. 2 shows an illustrative "User Content" page of a location aware user interface.

Referring now to FIG. 2, an illustrative "User Content" page of the user interface is shown. Illustrative user interface 200 is shown displaying a wireless handset having a touchscreen-type interface 202; however, it will be appreciated that the user interface may be displayed on any handheld wireless device having a display and a user input means (such as keypad, touchscreen interface, or stylus). Top menu bar 204 comprises top menu items "User Content" 206, "Info" 208, "All" 210, and "Map" 212. In the illustrative user interface, the top menu items are selectable items such as virtual buttons that are activated when the user touches the button on a touchscreen or selects the button with a pointing device. In FIG. 2, user content button 206 is highlighted, indicating that user content is the selected item from the top menu. When the user content menu item is selected, the user interface displays the user content page. The user content page comprises one or more user-created content items. Illustrative user-created content items 214-224 are displayed on the illustrative user content page.

The user-created content item comprises user input text, such as the text shown at 226. The user-created content item may also comprise a timestamp 228. Timestamp 228 comprises information about when the user-created content item was posted. The timestamp may be displayed as a time, date, or combination of time and date. The timestamp may further comprise the username of the user that posted the user-created content item.

In some embodiments, the user-created content items are displayed in the user interface as clickable buttons. When the user-created content item button 230 is activated, the display may show additional content associated with the user-created content item. The user-created content item may comprise additional content such as video, audio, images, and external website links. In some embodiments, an icon is shown proximate to the user-created content item to indicate a type of additional content associated with the user-created content item. For example, icon 232 is a video icon indicating that the user may access video by clicking user-content item 216. When the additional content is graphical content such as an image or video, a thumbnail of the image or video may be shown. The additional content of content item 224 is an image, as indicated by thumbnail 234.

A feedback input may be displayed proximate to or in conjunction with each user-created content item. The feedback input allows a user to react to the content items displayed. The feedback input may be displayed, for example, as "thumbs up" and "thumbs down" symbols displayed on a user-created content item button, as shown at 234. The thumbs up and thumbs down input prompts are operable separately from the content item button. When a user selects a feedback input prompt, the wireless handset transmits a feedback message to the remote server indicating the feedback response, e.g., whether the feedback was positive ("thumbs up") or negative ("thumbs down"). The feedback message may also comprise information about the user, such as a username or user identification. Alternative feedback input means, such as a system that allows a user to rate a content item on a scale, such as a scale of one to ten or a scale of one to five, may be used.

The feedback input is stored on the remote server. Typically, the feedback input is used to modify a relevance weight value stored in association with the content item. The feedback input may be used to rank content to be displayed in the user interface. The content items transmitted from the remote server to the wireless handset may be filtered by relevance weight value such that a predetermined number of highest ranked content items are returned or such that only those content items exceeding a predetermined threshold are returned. In some embodiments, the content items transmitted from the remote server to the wireless handset are filtered by relevance weight value and also by association with the geofence in which the wireless handset is located.

User interface controls 232-236 may be displayed on one or more pages of the user interface. When back control 238 is selected, the page displayed prior to the current page is displayed. When home control 242 is selected, the main page of the user interface is displayed. For example, if the all content page (selected with button 210 and shown in FIG. 5) is the main page of the user interface, the all content page will be shown when the home control is selected. When post control 240 is selected, the user content input page is shown.

Figure 3:
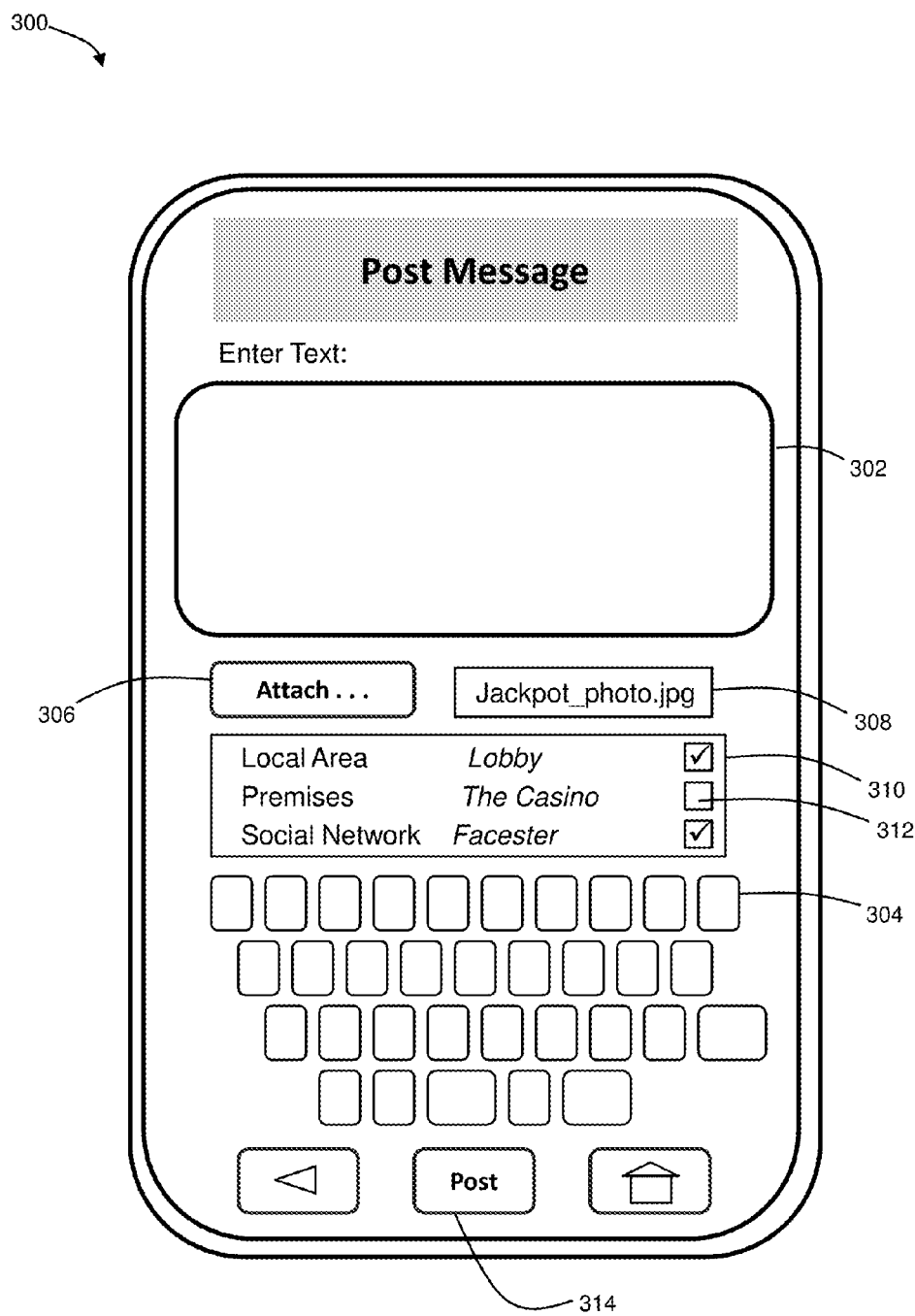
FIG. 3 shows an illustrative user content input page of the user interface.

Referring now to FIG. 3, an illustrative user content input page 300 of the user interface is shown. User content input page comprises input window 302. The user may enter text in the input window using an alphanumeric input, such as a keyboard, keypad, or the touchscreen alphanumeric interface shown at 304. The user content input page may further comprise an attachment prompt such as the attach button shown at 306. When the user activates the attach button, the user is prompted to enter the additional content, for example, by selecting a file or entering a URL. The file may be, for example, an image, video, audio, or other media supported by the user interface application. After the additional content is selected, the URL or name of the content file may be displayed, for example, in an additional content box as shown at 308.

In some embodiments, one or more additional content items may be attached to a content item. The additional content box may display a list of items when more than one additional content items are attached to a content item.

The user-created content item comprises any text entered in the input window and any attached additional content. An input module of the wireless handset receives the user-created content item and transmits the user-created content item to the remote server. The user-created content item may be automatically stored in association with the geofence in which the handset is located. Alternatively, the user may designate one or more destinations with which the user content item is to be associated. At 310, the user is presented with the option of posting the user-created content item to 1) the geofence or "Local Area" in which the handset is located, identified as "Lobby," 2) the entire premises, identified as "The Casino" or 3) a social network, identified as "Facester." The premises may comprise one or more geofences. In some embodiments, the user is presented with the option to designate one or more social networks to which the user-created content item is to be posted. The user may select posting destinations by selecting the checkbox 312 located adjacent to the desired posting destination. When the user has finished entering content and designating posting destinations, the user may post the content by activating post button 314.

Figure 4:
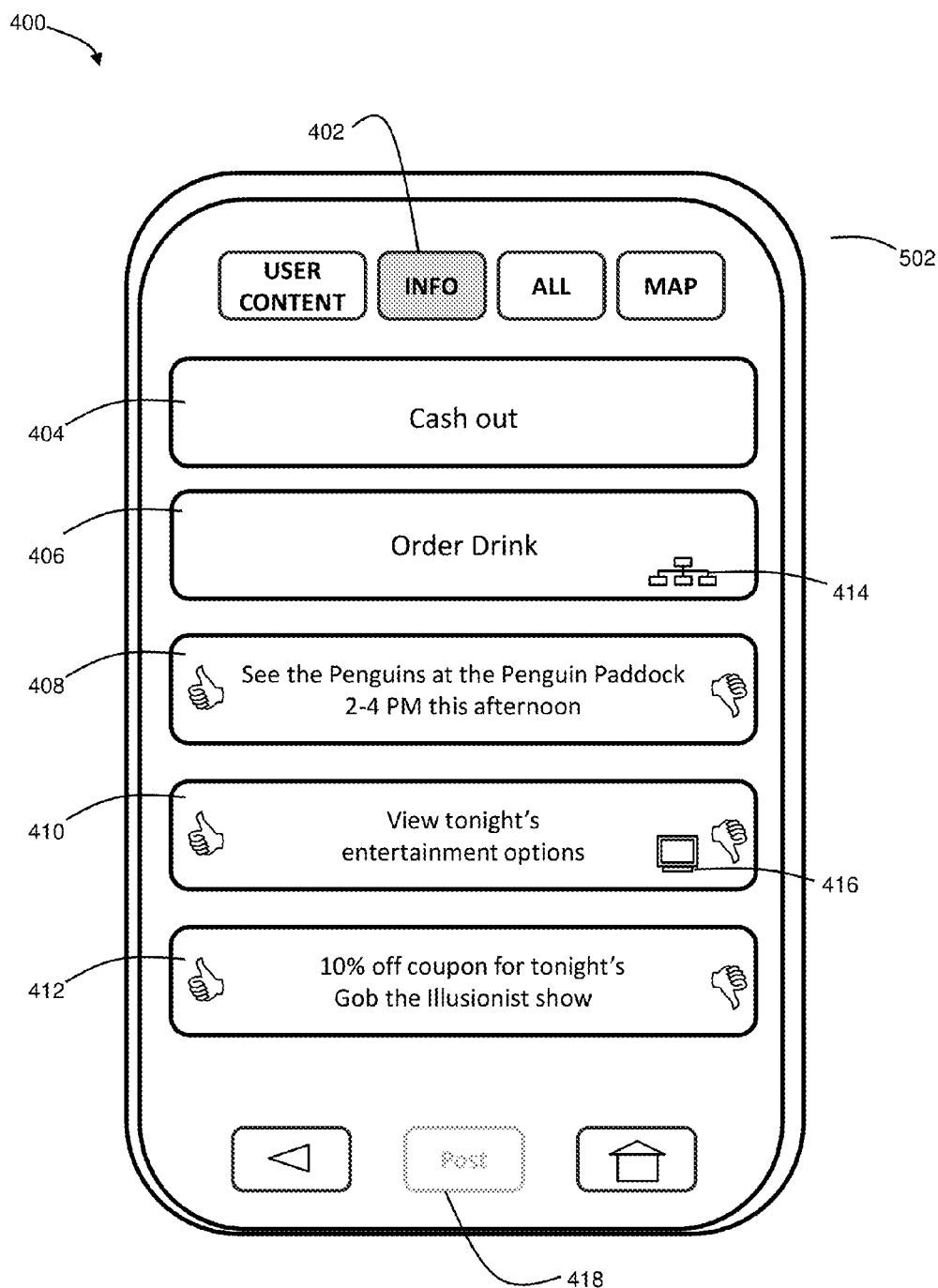
FIG. 4 shows an illustrative "Info" page of the user interface.

Referring now to FIG. 4, an illustrative "Info" page 400 is shown. The info page displays premises content items that provide information about the premises, such as information about events, services, and promotions available on the premises. Unlike user content items, the content items on the info page are typically created by a content administrator affiliated with the premises. In FIG. 4, info button 402 is highlighted, indicating that info is the selected item from the top menu. When the info menu item is selected, the user interface displays the info page. The info page comprises one or more premises content items. Illustrative premises content items 404-412 are displayed on the illustrative user content page. Premises content items may comprise timestamps and feedback input prompts.

Illustrative premises content item 404 indicates a "Cash Out" service offered by the premises. If a user has been gambling and wishes to cash out, the user may select the content item 404. When content item 404 is selected, the application sends a message to the remote server, the message comprising an identifier for the content item and a location message indicating the location of the wireless handset. The remote server interprets the identifier for the content item and alerts the premises of the cash out request so that the user may be provided with the cash out service.

Premises content items may comprise additional content such as video, audio, images, external website links, maps, menus, and content to be shown on a display. In some embodiments, an icon is shown proximate to the premises content item to indicate a type of additional content associated with the premises content item. For example, icon 414 is a parent link icon indicating that content item 406 is a parent content item having a link to child content item. Multiple child content items may be linked to a parent content item to create a menu. When the user selects premises content item 406, the user is presented with a user interface page comprising a list of drink options. Each drink option may be a premises content item that is a child content item of the Order Drink parent content item. Icon 416 is a display icon indicating that the additional content associated with content item 410 will be shown on a display proximate to the wireless handset when the content item is selected. Exemplary methods for showing content on a display proximate to a wireless handset are described in application 61/427,755 and 61/427,753 incorporated herein by reference. When a user selects content item 410, the wireless handset sends a message to the remote server, the message comprising an identifier for the content item and a location message indicating the location of the wireless handset. The remote server interprets the identifier for the content item and sends the content associated with the content item to a display proximate to the wireless handset. Typically, the display is located in the same geofence within which the wireless handset is located.

Because content items 404 and 406 indicate services offered by the premises that are always to be shown at the top of the menu, feedback inputs are not displayed in conjunction with these content items.

In FIG. 4, post control 418 is shown grayed out to indicate that it cannot be selected by the user. Typically, the user is not enabled to post user content when the user interface is displaying the info page because the info page displays premises content items but not user-created content items.

Figure 5:
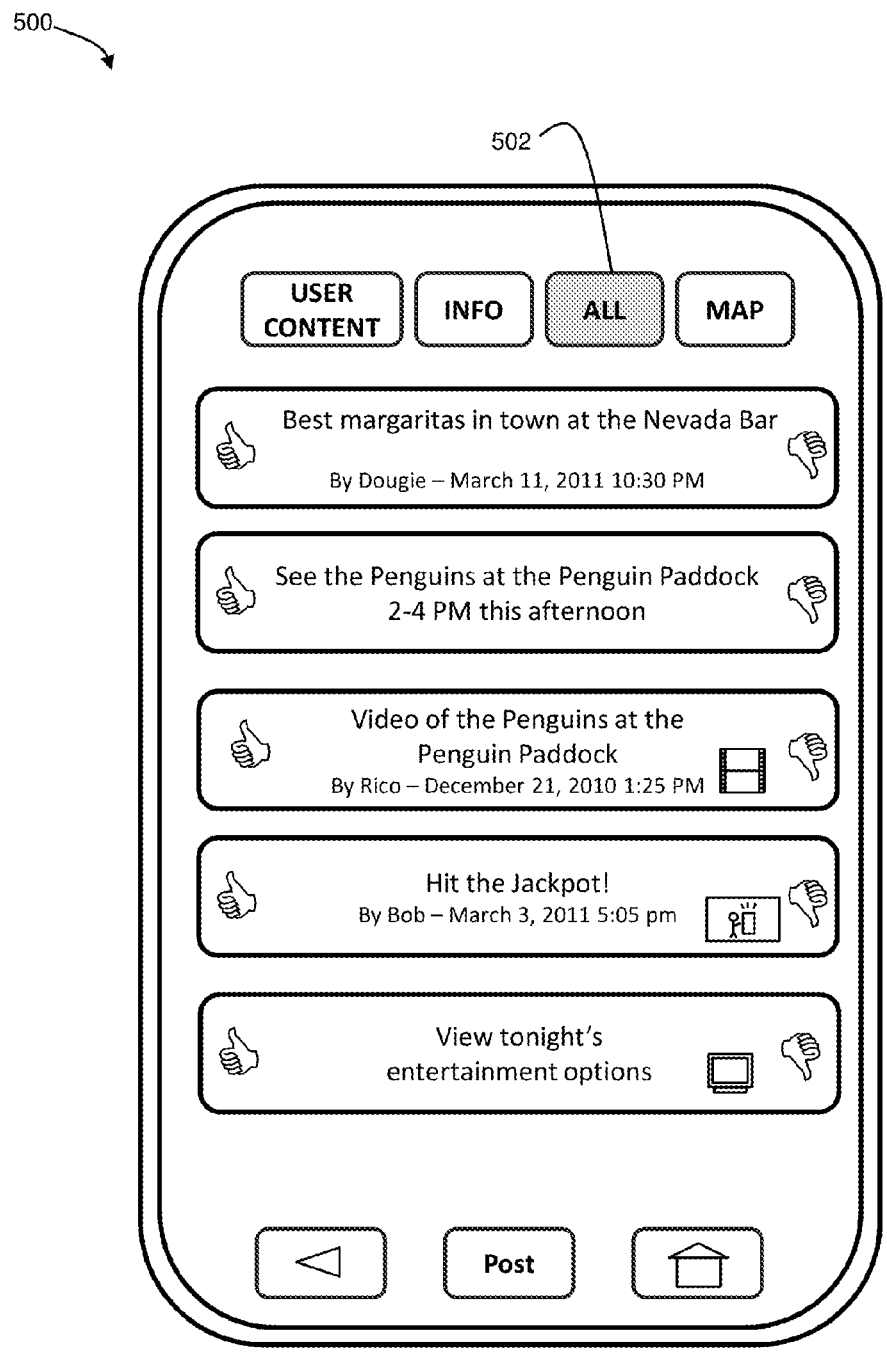
FIG. 5 shows an illustrative "All" page of the user interface.

Referring to FIG. 5, an illustrative "All" page 500 is shown. The all page displays premises content items and user-created content items. The content items shown are typically the highest ranked content items as determined from the feedback inputs. Accordingly, the all page allows the user to view the most highly ranked content items from both the user content page and the info page. In FIG. 5, all button 502 is highlighted, indicating that all is the selected item from the top menu. When the all menu item is selected, the user interface displays the all page.

Figure 6:
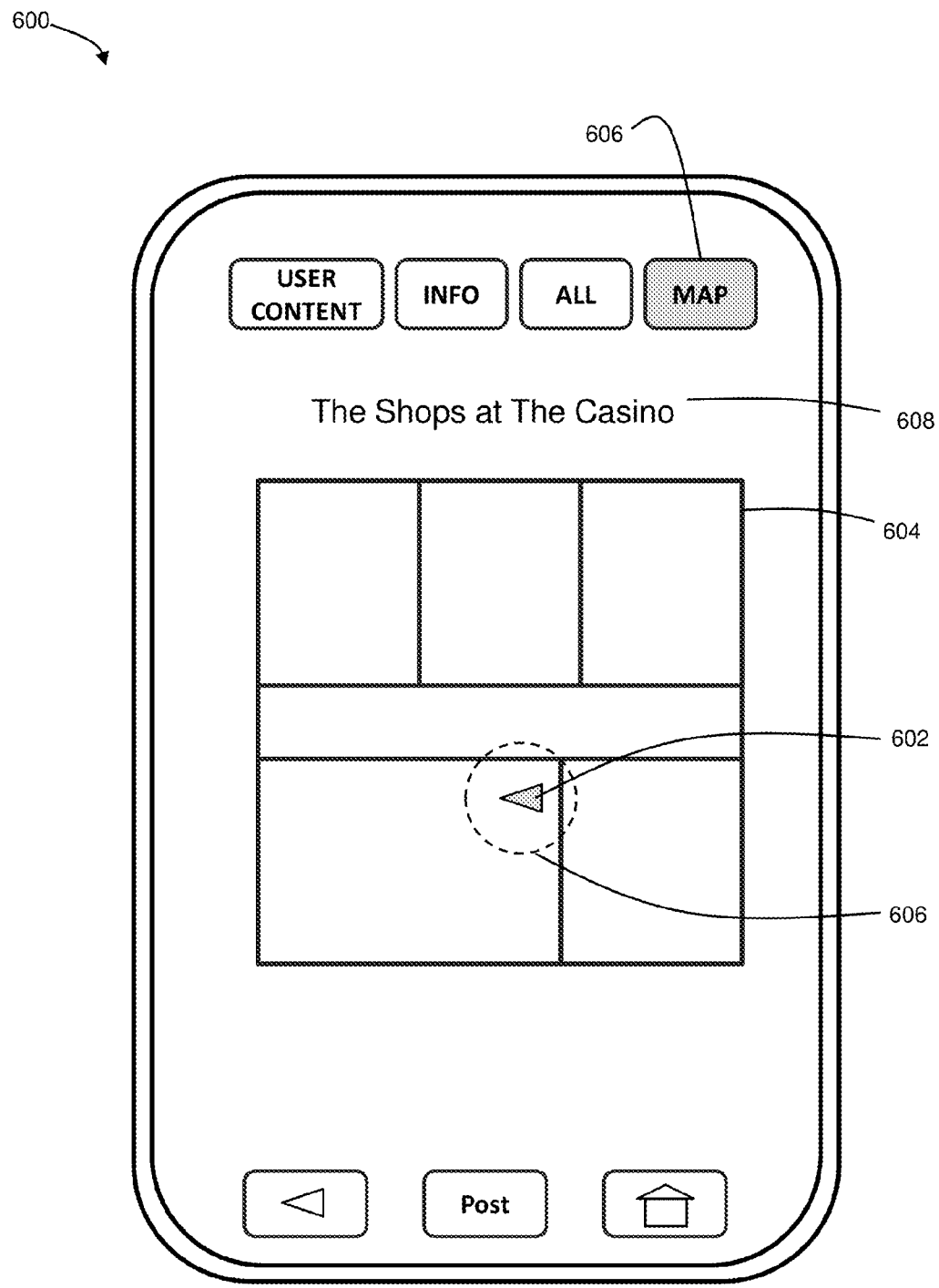
FIG. 6 shows an illustrative map page of the user interface.

Referring now to FIG. 6, an illustrative map page 600 is shown. The map page displays the user location 602 on a premises map 604. In FIG. 6, map button 606 is highlighted, indicating that map is the selected item from the top menu. When the map menu item is selected, the user interface displays the map page.

In some embodiments, the map shows radius 606 that indicates a radius around the estimated position of the wireless handset indicating the potential actual position of the wireless handset. The radius may be based on a calculated margin of error for the calculated position of the wireless handset. The map page may also comprise map title 608.

In some embodiments, the interval at which a location message is sent from the wireless handset to the remote server when the map page is shown is different from the interval at which the location message is sent when the other pages of the user interface are shown. Typically, a faster interval is required for updating the location on the map than is required for updating content items.

Figure 7:
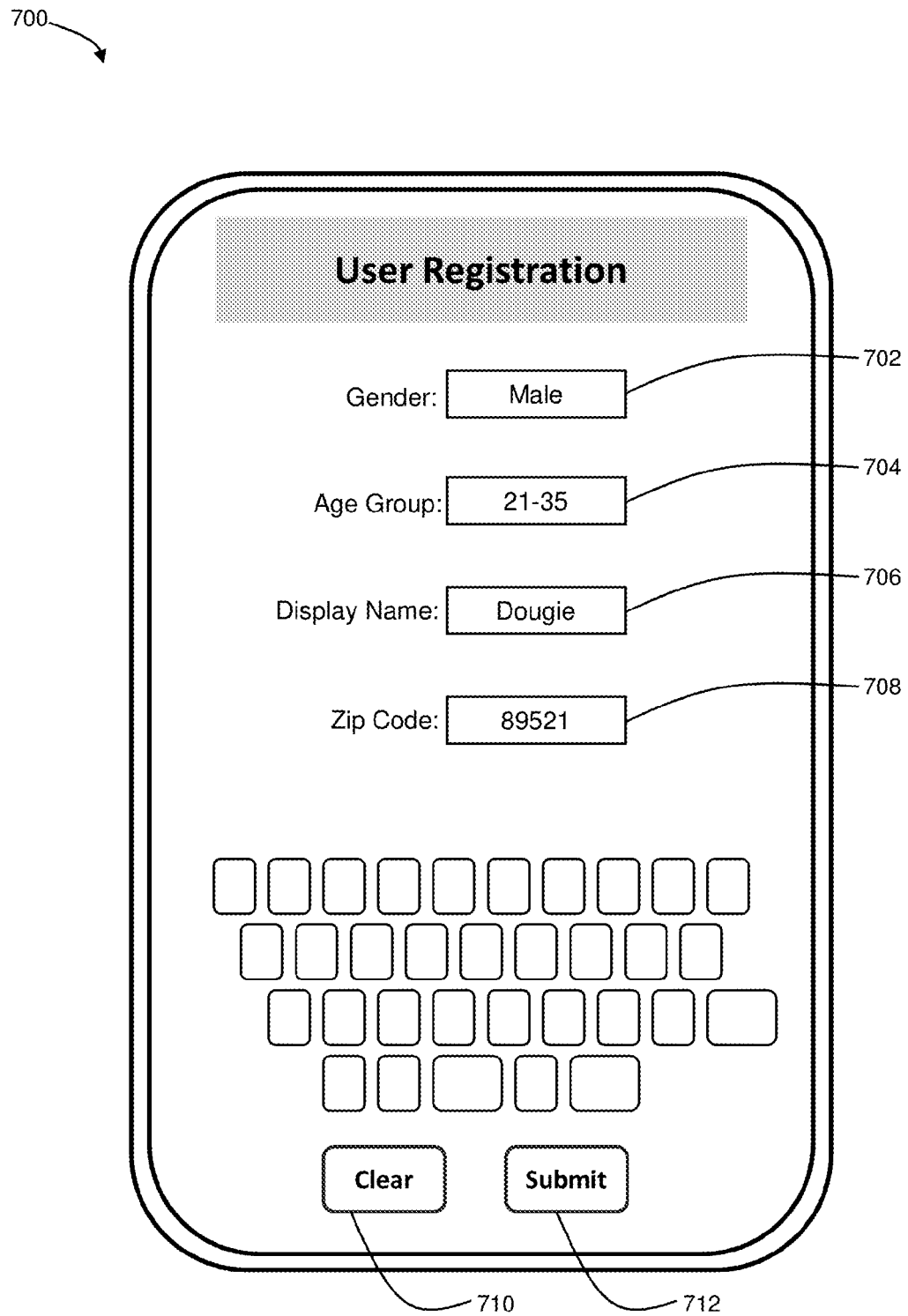
FIG. 7 shows an illustrative user registration page of the user interface.

Referring now to FIG. 7, an illustrative user registration page 700 is shown. In some embodiments, the user is prompted to register. The user may be prompted to register prior to viewing the user interface for the first time, when attempting to post a comment for the first time, or at another time. The user is shown the user registration page, where the user is prompted to enter a display name in display name field 706. The user may be prompted to enter additional information such as gender in gender field 702, age group in age group field 704, zip code in zip code field 708 or other information including contact or demographic information and information about the user's interests. One or more fields may be required for the user registration submission to be accepted. If the user wishes to erase entered information, the user selects clear button 710 will clear all entered information. When all of the required information is entered, the user selects submit button 712 to submit the information.

In some embodiments, the content items transmitted from the remote server to the wireless handset are filtered according to one or more fields of the user profile. For example, if the user entered "Female" in the gender field of the user profile, the remote server may filter the content items to select only those content items associated with the gender female. The remote server then transmits the selected content items to the wireless handset. The content items transmitted from the remote server to the wireless handset may be further filtered by relevance weight value such that a predetermined number of highest ranked content items are returned or such that only those content items exceeding a predetermined threshold are returned.

In an alternative embodiment, the content items transmitted from the remote server to the wireless handset are filtered according to both geofence and one or more fields of the user profile. For example, the remote server may filter the content items to select only those content items associated with the gender female and also associated with the geofence in which the wireless handset is located. Relevance weight filtering may also be applied.

Figure 8:
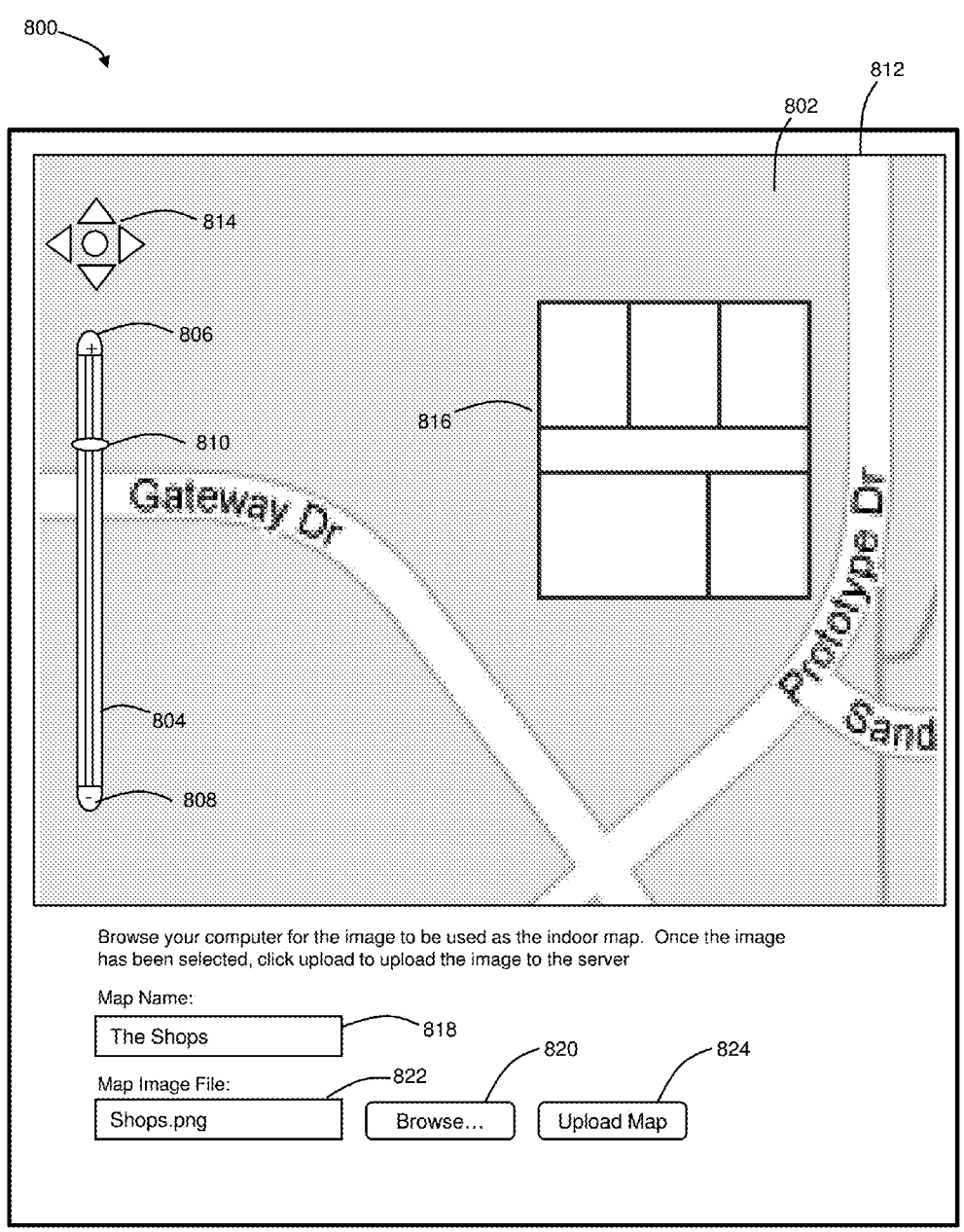
FIG. 8 shows an illustrative geographic information system interface.
Figure 10:
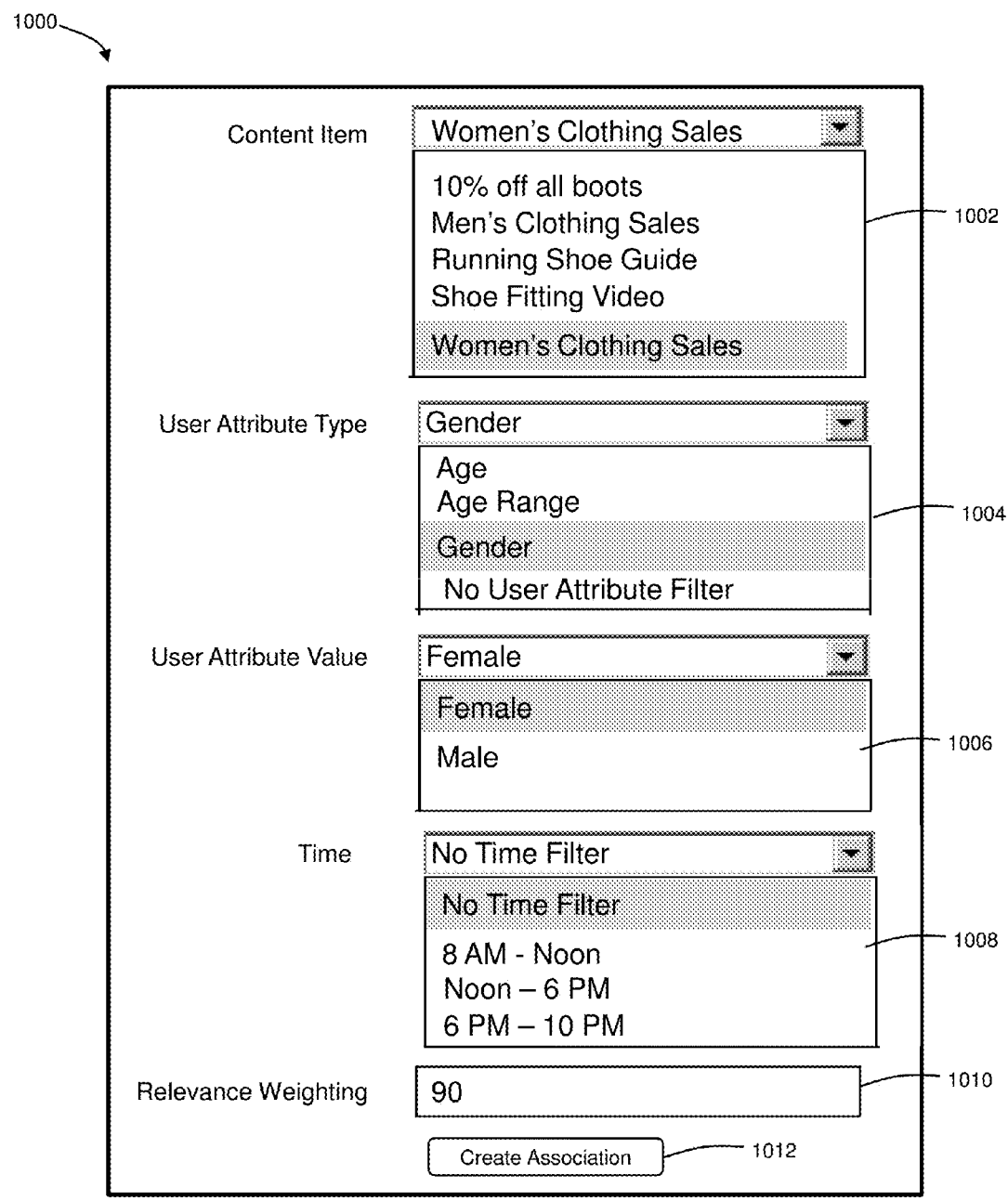
FIG. 10 shows an illustrative user profile content association interface.

FIGS. 8-10 describe content administrator interfaces used in the process of creating geofences and content associations. The interfaces may run on remote server 106 or on another computing device configured to communicate with the remote server.

Referring to FIG. 8, an illustrative geographic information system (GIS) interface 800 is shown. A content administrator for a premises may indicate the location of a premises map relative to a street map using the GIS interface. The content administrator may use magnification bar 804 to adjust the magnification of street map 802 to the appropriate scale for placement of the premises map. Magnification bar 804 comprises increase magnification indicator 806, decrease magnification indicator 808, and sliding magnification control 810. The content administrator may slide the sliding magnification control 810 in the direction of the increase magnification indicator 806 to increase the level of magnification of the map and may slide the sliding magnification control 810 in the direction of the decrease magnification indicator 808 to reduce the level of magnification of the map. To change the position of the street map 802 within map window 812, navigation control 814 may be used. Navigation control 814 comprises an up arrow, a down arrow, a left arrow and a right arrow. To move the street map in the desired direction, the arrow pointing in the desired direction is mouse clicked. Navigation may additionally or alternatively be accomplished by mouse clicking on street map 802, holding down the mouse button, and moving the mouse to slide the map in the desired direction. It will be recognized that other methods for adjusting map magnification and map position within the map window may be used.

When the appropriate level of magnification has been reached, the content administrator may insert a merchant premises map image 816 over the street map and position the premises map relative to the street map. The content administrator may be prompted to enter a name for the premises map in a text box such as map name text box 818. The content administrator selects a map image file to insert over the street map. For example, the content administrator may click a browse button 820 to open a dialog box allowing the content administrator to choose a map image file from a file directory. When an image file has been selected, the name of the image file may appear in a text box as shown at 822. The content administrator may then upload the selected map, for example, by hitting an upload map button 824. After the map is uploaded, it appears within map window 812. The premises map image 816 may be resized and rotated with mouse controls or other interface controls. The content administrator may place the premises map image 816 in the appropriate position relative to street map 802. For example, the content administrator may place the premises map image by mouse clicking on the premises map image, holding down the mouse button, and dragging the premises map image to the desired position. It will be recognized that other methods for selecting a map image and positioning it at a desired location on a street map may be used. The position of premises map 816 relative to street map 802 is stored, for example, on remote server 106. The level of magnification and position of street map 802 within map window 812 may also be stored. The image file or a string representing a path to the image file may also be stored. Additionally, the map name entered in text box 818 may be stored.

Referring now to FIG. 9, an illustrative geofence creation interface 900 is shown. A geofence is a virtual boundary indication inserted by a user on a premises map using a graphical user interface. The content administrator provides a map 902, such as a premises floor plan, on which the geofences will be defined. The map may be provided by uploading an image file to the GIS interface as indicated in FIG. 8. The content administrator uses a shape drawing tool to define a geofence. The shape drawing tool may allow the content administrator to create rectangles, polygons, or other shapes overlayed on the premises map. After a geofence shape has been created, the content administrator may be prompted by the geofence application to enter an identifier for the geofence.

The geofence interface may comprise geofence selection drop down menu 914 and content item selection drop down menu 916. To create an association between a content item and a geofence, the desired geofence and the desired content item are selected from the geofence selection drop down menu and the content item selection drop down menu, respectively. In FIG. 9, geofences 904, 906, 908 and 910 have been defined, corresponding to the Shoe Store, Restaurant, Retailer-Women's Clothing and Retailer—Men's Clothing, respectively. The content items "10% off all boots" and "Running Shoe Guide" have been selected from content item menu 916. In this manner, an association has been created between these content items and the Shoe Store geofence, indicated at 904.

Using relevance weighting box 918, the content administrator may assign an initial relevance weight value to the geofence-content association created in tables 914-916. When the content administrator has finished creating a content association with the interface, the content administrator selects create association button 920 to store the association in a database.

Referring to FIG. 10, an illustrative user profile content association interface 1000 is shown. The user profile content association interface allows the content administrator to restrict the delivery of content items from the remote server to the wireless handset based on information such as user profile data and time of day. For example, in FIG. 9, the content administrator associated the content item "Running Shoe Guide" with the Shoe Store geofence. The content administrator may wish to display the Running Shoe Guide to only those users between the ages of 21-35. The content administrator may use the tools of the user profile content association interface to indicate that the "Running Shoe Guide" content item is only to be displayed on the wireless handset Shoe Store if the wireless handset is within the Shoe Store geofence and the user profile of the wireless handset is between the ages of 21-35 as indicated on the user registration page of the user interface.

The content administrator selects a content item from a predefined list of content menu items as shown in the drop down menu 1002. In the illustrative example shown in FIG. 10, the content administrator has chosen the content item "Women's Clothing Sales."

The content administrator may subsequently choose a user attribute to associate with the content item using user attribute type drop down menu 1004 and user attribute value drop down menu 1006. At menu 1004, the content administrator has chosen user attribute type "Gender." The content administration application subsequently populates user attribute value drop down menu 1006 with the attribute values associated with the user attribute type specified in drop down menu 1004.

If the user attribute type is a range, such as an age range, the attribute value menu may be presented in a format to allow entry of the values bounding the range. For example, the user attribute menu may be presented as a pair of text entry boxes that allow the content administrator to enter a minimum age and a maximum age.

Menu 1006 has been populated with the user attribute values "Female" and "Male," which are the user attribute values associated with user attribute type "Gender." In menu 1006, the content administrator has selected the attribute value "Female" to associate with the selected content item "Women's Clothing Sales." As a result, the content item "Women's Clothing Sales" will only be displayed to those users whose user profiles indicate that the user is a female. When a female user is within a content bubble defining the active range for a display with which the content item "Women's Clothing Sales" has been associated, the display shows the content item "Women's Clothing Sales."

The content administrator may wish to distribute a content item to all users. This may be accomplished by selecting "No User Attribute Filter" from the user attribute type menu.

The content administrator may also specify a time to associate with the content item, thereby creating a content item time association. Menu 1008 allows the content administrator to indicate that the content item is to be displayed only during a particular period of time. For example, an advertisement pertaining to coffee may be shown only during the time range 8 AM-Noon. The "No Time Filter" option has been selected from menu 1008. As a result, the content item "Women's Clothing Sales" will be shown to female users at all times.

The time ranges shown in menu 1008 are merely illustrative and it will be recognized that other time ranges could be implemented. In some embodiments, the content administrator may specify alternative measures of time, such as a range of dates or specified days of the week. The time menu may allow a content administrator to designate times or dates bounding a range. For example, the time menu may be presented in a format, such as a pair of text entry boxes, that allow the content administrator to enter a starting time and an ending time.

In some embodiments, the content administrator may associate content items with other or additional attributes. An example is merchant specific attributes, which are attributes associated with a user that were not specified by the user. For example, a merchant specific attribute may comprise information from the user's transactional history with the merchant.

The content administrator may assign an initial relevance weight value to the content-attribute association created in tables 1002-1008. The initial relevance value may be a numerical value on a scale, such as a number falling in the range of 1-100, with 1 indicating minimum relevance and 100 indicating maximum relevance. As shown in 1010, the content administrator has chosen an initial relevance weighting value of 90. As an example, the content item "Women's Clothing Sales" may be considered to be highly relevant to females, but less relevant to males. If a content administrator intends for both females and males to be able to view the content item, but wishes to assign a lower priority to displaying the content item if the viewer is a male, the content administrator may assign a high relevance value to the association between the content item and the user attribute value "Male" and a low relevance value to the association between the content item and the user attribute value "Female." User feedback received from the user interface may be used to modify the relevance weighting value.

When the content administrator has finished creating a content association with the user profile content association interface, the content administrator selects create association button 1012 to store the association in a database.

Figure 11:
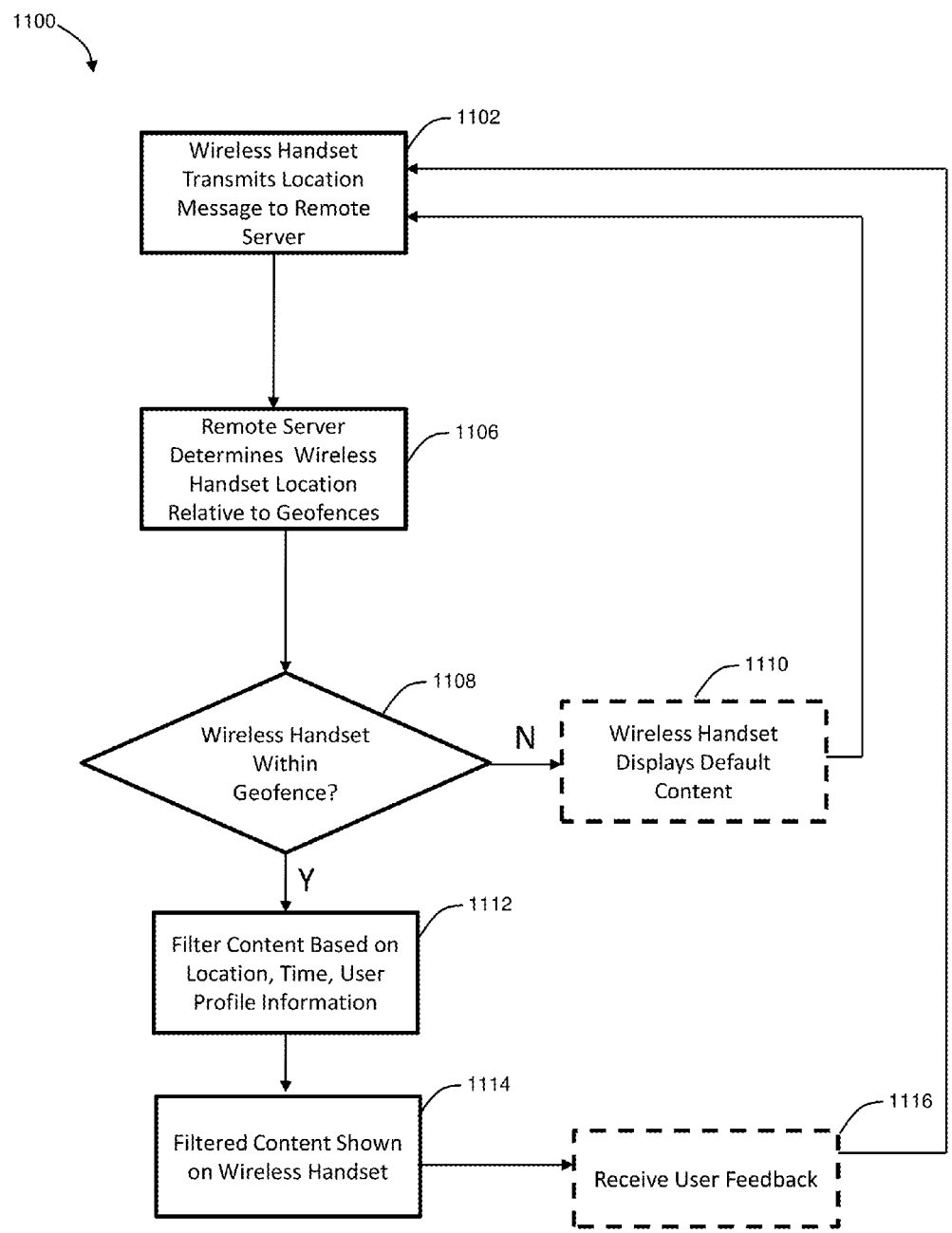
FIG. 11 shows a flow chart of an illustrative method for delivering location-specific content to a wireless handset.

Referring now to FIG. 11, a method for delivering location-specific content to a wireless handset. The method begins at block 1102, in which wireless handset 102 transmits a location message to remote server 106. The method continues to block 1106, in which the remote server determines the wireless handset location relative to the geofences defined as shown in FIG. 9. The method proceeds to decision diamond 1108, at which it is determined whether the wireless handset is located within a geogence. If the wireless handset is not within a geofence, the method proceeds to optional block 1110. At optional block 1110, default content is provided to the wireless handset. The default content may be a message indicating that the handset is beyond the range of any geofences on the premises. Alternatively, the default content may comprise content items such as content filtered by time, one or more user profile fields, relevance weight value, or a combination of these (but not filtered by location). If optional block 1110 is omitted, the method proceeds to block 1102.

If the wireless handset is determined to be within a geofence, the content items of content module 114 are filtered to select only those content items associated with the geofence, as indicated at block 1112. Content may be filtered according to one or more of location (association between a content item and a geofence), time, one or more user profile fields, and relevance weight value. Additional filters may be used. The method proceeds to block 1114, at which the filtered content resulting from block 1112 is displayed on the wireless handset. At optional block 1116, the user provides feedback on the content shown on the display. For example, the user may be presented with the opportunity to give an indication of approval or disapproval, such as "thumbs up" and "thumbs down" icons which the user may select. The user feedback may be used to adjust initial relevance value 1010 assigned to a content item association as shown in FIG. 10. If optional block 1116 is omitted, the method proceeds to block 1102.

It is to be understood that the detailed description of illustrative embodiments are provided for illustrative purposes. The scope of the claims is not limited to these specific embodiments or examples. Therefore, various process limitations, elements, details, and uses can differ from those just described, or be expanded on or implemented using technologies not yet commercially viable, and yet still be within the inventive concepts of the present disclosure. The scope of the invention is determined by the following claims and their legal equivalents.

What is claimed is:

1. A location aware user interface on a wireless handset, comprising:
    a location module configured to transmit a location message to a remote server via a network, the location module further configured to transmit an updated location message to the remote server, the remote server configured to determine whether the wireless handset is within a beacon location;
    a display module configured to display at least one content item associated with the beacon location, the display module further configured to display at least one updated content item associated with the beacon location; and
    an input module configured to receive a user feedback item and transmit the received user feedback item to the remote server, the remote server configured to associate the user feedback item with the beacon location in which the wireless handset is located.

2. The user interface of claim 1 wherein the display module is configured to display at least one content item associated with a user profile field.

3. The user interface of claim 1 wherein the display module is configured to display at least one content item associated with a time range.

4. The user interface of claim 1 wherein the display module is further configured to display the position of the wireless handset on a premises map.

5. The user interface of claim 1 wherein the input module is further configured to receive a designation of additional destinations for user feedback to be posted.

6. The user interface of claim 5 wherein the additional destinations include a premises.

7. The user interface of claim 5 wherein the additional destinations include a social network.

8. The user interface of claim 1 wherein the user feedback item is a user-created content item.

9. A location aware content delivery system, comprising:
    a wireless handset configured to transmit a location message to a remote server via a network, the wireless handset configured to transmit an updated location message to the remote server via the network;
    the remote server including:
        a positioning module configured to receive the location message from the wireless handset and determine if the wireless handset is within a beacon location, the positioning module further configured to receive the update location message from the wireless handset and determine if the wireless handset is within the beacon location;
        a content module configured to transmit at least one content item associated with the beacon location to the wireless handset, the content module further configured to transmit at least one updated content item associated with the beacon location;
    a user interface executed by the wireless handset, the user interface configured to display the at least one content item, the user interface configured to display the at least one updated content item; the user interface further configured to receive a user-created content item; and the user interface further configured to transmit the user-created content item to the remote server, the remote server configured to store the user-created content item in association with the beacon location in which the wireless handset is located.

10. The system of claim 9 wherein the display module is configured to display at least one content item associated with a user profile field.

11. The system of claim 9 wherein the display module is configured to display at least one content item associated with a time range.

12. The system of claim 9 wherein the display module is further configured to display the position of the wireless handset on a premises map.

13. The system of claim 9 wherein the input module is further configured to receive a designation of additional destinations for user feedback to be posted.

14. The system of claim 13 wherein the additional destinations include a premises.

15. The system of claim 13 wherein the additional destinations include a social network.

16. The system of claim 9 wherein the user feedback item is a user-created content item.

17. A method for location aware content delivery, comprising:
    transmitting a location signal from a wireless handset to a remote server via a network;
    transmitting an updated location signal from the wireless handset to the remote server via the network;
    determining with the remote server if the wireless handset is within a beacon location;
    filtering, with the remote server, content items to select content items associated with a beacon location within which the wireless handset is located;
    transmitting at least one content item associated with the beacon location from the remote server to the wireless handset;
    transmitting at least one updated content item associated with the beacon location from the remote server to the wireless handset;
    displaying the at least one content item on a user interface executed by the wireless handset;
    displaying the at least one updated content item on the user interface executed by the wireless handset;
    receiving a user feedback item on the wireless handset;
    transmitting the user feedback item to the remote server; and
    storing the user feedback item in association with the beacon location on the remote server.

18. The method of claim 17, further including:
    filtering, with the remote server, content items to select content items associated with a user profile field; and
    transmitting at least one content item associated with the user profile field from the remote server to the wireless handset.

19. The method of claim 17, further including:
    filtering, with the remote server, content items to select content items associated with a time range; and transmitting at least one content item associated with the time range from the remote server to the wireless handset.

20. The method of claim 17, further including displaying the position of the wireless handset on a premises map.

21. The method of claim 17, further including receiving a designation of additional destination for user feedback to be posted.

22. The method of claim 17 wherein the user feedback item is a user-created content item.

\* \* \* \* \*